United States Patent

[11] 3,596,696

| [72] | Inventors | Helmut Freytag<br>Cologne-Stammheim;<br>Ivo Dane, Leverkusen; Erwin Muller,<br>Leverkusen; Guido Fromandi, Schildgen,<br>all of, Germany |
|---|---|---|
| [21] | Appl. No. | 849,538 |
| [22] | Filed | July 14, 1969 |
| [45] | Patented | Aug. 3, 1971 |
| [73] | Assignee | Farbenfabriken Bayer Aktiengesellschaft<br>Leverkusen, Germany |
| [32] | Priority | Aug. 14, 1964 |
| [33] | | Germany |
| [31] | | F 43758 |
| | | Continuation of application Ser. No.<br>478,723, Aug. 10, 1965, now abandoned. |

[54] VULCANIZABLE RUBBER COMPOSITIONS AND LAMINATED SOLID RUBBER TEXTILE COMPOSITION BASED ON THE SAME
14 Claims, No Drawings

[52] U.S. Cl. .................................................. 152/330,
152/359, 156/110, 156/331, 156/335, 161/92,
161/227, 161/231, 161/241, 161/248, 161/256,
161/257, 161/260, 260/3, 260/852, 260/856
[51] Int. Cl. ..................................................... B29h 5/02,
B32b 27/42, B60c 5/00
[50] Field of Search........................................... 260/3, 852,
856; 161/227, 241, 248, 257; 156/110, 331, 335,
338; 152/330, 359

[56] References Cited
UNITED STATES PATENTS

| 2,927,051 | 3/1960 | Buckwalter et al. | 161/241 X |
|---|---|---|---|
| 3,097,111 | 7/1963 | Danielson | 117/162 |
| 3,194,294 | 7/1965 | Van Gils | 152/330 |
| 3,226,276 | 12/1965 | Rye et al. | 156/335 |
| 3,361,617 | 1/1968 | Kaizerman | 156/110 MD |

OTHER REFERENCES

Schildknecht, " Polymer Processes," Vol X. pgs. 338, 339 Feb. 28, 1956, Interscience Publishers, N.Y. City.

*Primary Examiner*—John T. Goolkasian
*Assistant Examiner*—C. B. Cosby
*Attorney*—Connolly & Hutz ABSTRACT: Solid vulcanizable rubber composition having improved bonding properties for textile compositions and based on hexamethylol melamine or an ester or a partial ether thereof as a first additive and an m-substituted benzene derivative containing —OH, —$NH_2$ or —$OCOCH_3$ groups or 1,5-dihydroxynaphthalene as the second additive.

VULCANIZABLE RUBBER COMPOSITIONS AND LAMINATED SOLID RUBBER TEXTILE COMPOSITION BASED ON THE SAME

This application is a continuation of application Ser. No. 478,723 filed Aug. 10, 1965, and now abandoned.

This invention relates to improvements in the method of adhering textile materials to rubber and to the improved laminates so obtained.

In a large number of rubber articles designated to withstand considerable stresses in use, the rubber is reinforced with plies of textile materials. Thus, tires, rubber hose and belts are commonly reinforced with filamentary textiles in the form of yarns, cords or fabric. In such articles, it is important that the plies of textile reinforcing material be firmly adhered to the rubber and remains effectively adhered even after the article has been subjected to repeated varying strains in use. This problem becomes especially important if textile materials on a synthetic or partly synthetic basis are used. In order to improve the adhesion of the textile material to the rubber intermediate the textile plies, it is common practice to preimpregnate the textile materials, such as a tire cord fabric with a rubber mixture, e.g. by passing the textile material through a bath of an aqueous dispersion of a rubber, such as a rubber latex composition. These rubber latices preferably contain a dissolved or dispersed resin, e.g. a partially reacted resorcinol-formaldehyde resin, such as a condensate of resorcinol and formaldehyde in the ratio of 1 mol. of resorcinol with less than 1 mol. of formaldehyde, and formaldehyde or a formaldehyde yielding agent which cures the fusible resin to an infusible state during the further processing. The results obtained are not satisfying.

It is an object of the present invention to provide a process which gives an improved adhesion between rubber and untreated textile materials. It is another object of the present invention to provide a further improvement in the adhesion of the textile material to the rubber in addition to that obtained by the aforementioned known process. It is a further object to provide new compounds which can be used for such improvement. Further objects will appear hereinafter.

It has been found according to the invention that the adhering of textiles to rubber (bond strength) can be increased by applying to the textiles, rubber mixtures containing hexamethylol melamine, the hydroxyl groups of which may be esterified or partly etherified.

In a preferred embodiment of the process according to the invention, m-substituted benzene derivatives containing —OH—, —NH$_2$ — or —OCOCH$_3$ —groups, or 1, 5-dihydroxy naphthalene, are also added to the rubber mixtures. Resorcinol is preferably used as the m-substituted benzene compound.

The hexamethylol melamines used in accordance with the invention do not have to be pure. For example, it would be possible to employ products containing a somewhat smaller amount of formaldehyde, or some fairly high molecular weight condensation products. The hexamethylol melamine may be prepared in known manner, for example by reacting approximately 1 mol. of melamine with approximately 6 mols. of aqueous formaldehyde solution (cf. "Helvetica chimica acta," 24, page 315 E, Swiss Pat. No. 197,486 and Houben-Weyl, "Methoden der organischen Chemie," Vol. VIII, page 242).

As already mentioned, instead of hexamethylol melamine there may be used its esters and partly etherified derivatives which may be regarded as masked methylol compounds. Lower alkyl ethers are particularly suitable, such as methyl, ethyl, propyl, butyl and allyl ethers, in which case 1 to 5 hydroxyl groups may be etherified. The lower aliphatic carboxylic acid esters such as acetates and propionates, are mentioned in particular as suitable esters.

In addition to hexamethylol melamine or its derivatives, m-substituted benzene derivatives may also be added in the preferred embodiment of the process according to the invention. Apart from resorcinol, other examples of these compounds are m-aminophenol, m-phenylene diamine, resorcinol diacetate or propionate or butyrate and resorcinol monomethylether or propyl ether.

0.2 to 8 percent by weight, preferably 0.5 to 4 percent by weight, based on rubber, of the hexamethylol compound according to the invention or its derivatives, are mixed into the rubber mixture used for coating fabrics or filaments. If resorcinol or the other m-substituted benzene derivatives are added in approximately the same quantities as the hexamethylol compound, preferably in quantities 0.5 to 2 times greater than the hexamethylol compound, the adhesion-promoting effect is in most cases appreciably increased. In cases where resorcinol is used, it should be mixed in at temperatures above its melting point (above about 115° C).

Suitable types of rubber for the process according to the invention include both natural and synthetic rubber such as copolymers of butadiene-styrene, butadiene-acrylonitrile, isobutylene-isoprene, ethylene-propylene (optionally together with a third component), polyisoprene, polybutadiene, polychlorobutadiene and other components as well as blends thereof.

Suitable textiles include filaments, particularly cord filaments, as well as fabrics woven or knitted from all types of fibers such as rayon, polyamide, polyester, polyacrylonitrile, cotton and the like. The adhesion-promoting preimpregnation of the textiles may be carried out in conventional impregnating baths containing, for example latices based on natural rubber, butadiene-styrene, butadiene-acrylonitrile, chlorobutadiene, butadiene-styrene-vinyl pyridine polymers or blends thereof, and preferably, resorcinol-formaldehyde resin. Without preimpregnation, the effect of the products according to the invention is particularly pronounced in the case of polyamide fabrics.

The textiles are coated with the rubber mixture according to the invention by the processes normally used in the rubber industry. Similarly, the finished articles are vulcanized by standard processes.

EXAMPLE 1

Two tire-carcass mixtures of the following composition were mixed on a set of mixing rolls:

| | (Parts by wt.) | |
|---|---|---|
| | A | B |
| Natural rubber | 100.0 | 100.0 |
| Semi-active lampblack | 20.0 | 20.0 |
| Resorcinol | | 1.3 |
| Zinc oxide | 5.0 | 5.0 |
| Pinewood oil | 2.0 | 2.0 |
| Aromatic mineral oil | 4.0 | 4.0 |
| Phenyl-α-naphthylamine | 1.5 | 1.5 |
| Sulphur | 2.3 | 2.3 |
| Benzothiazyl-2-cyclohexylsulphenamide | 0.7 | |
| Benzothiazyl-2-sulphenemorpholide | | 0.7 |
| Diphenylguanidine | 0.1 | 0.4 |
| Hexamethylol melamine | | 1 |

Mixing was carried out as follows: a premix was initially prepared from rubber, lampblack and resorcinol at a mixing temperature of 130° C. After this premix had been cooled to about 100° C., the remaining components of the mixture were introduced, followed finally by the addition of the hexamethylol melamine which had been dispersed beforehand in aromatic mineral oil in a ratio of 1:1 in a ball mill. Since the addition of resorcinol and hexamethylol melamine is accompanied by a slight retardation of vulcanisation, the vulcanization behavior of the two mixtures was adjusted to approximately the same level by varying the vulcanization-accelerating additives.

Two strips 40 cm. long, 3 mm. thick and 2 cm. wide were prepared from the aforementioned mixtures. Rayon cord filaments were incorporated during vulcanization between these two strips, at right angles to direction of the strip and at an interval of 1.5 cm. The filaments had been impregnated beforehand with an impregnation mixture of the following composition:

| | |
|---|---|
| 60 percent natural rubber latex | 125.0 parts by wt. |
| 40 percent latex of a copolymer of butadiene, styrene and vinyl pyridine | 62.5 parts by wt. |
| Precondensed resorcinol formaldehyde resin | 20.0 parts by wt. |
| Formaldehyde | 6.0 parts by wt. |
| Water | 3986.5 parts by wt. |
| | 4200.0 parts by wt. |

Total dry content 3 percent.

In the course of drying, the filaments were heated for 10 minutes to 135° C. The test specimens containing the filaments were vulcanized for 50 minutes at 138° C.

To determine the static bond strength, 1.5 cm. long individual test specimens were punched out of the test strips in such a way that one cord filament (length embedded in the test specimen = 2 cm.) lay in the center: After preheating to 80° C., the force required to pull the filament out of the rubber was measured at an ambient temperature of 80° C.

The dynamic bond strength was determined by clamping the test strips in the movable part of a testing machine, and then heating them to 80° C. The projecting ends of the cord filaments were anchored to the stationary part of the machine. The rubber was then reciprocated 500 times per minute over a total distance of 2.5 mm. (± 1.25 mm.). The time which elapsed before the cord fiber was detached from the rubber under these conditions, was then measured.

These two methods of testing bond strength are described in detail in "Bayer-Mitteilungen fur die Gummiindustrie," No. 29, pp. 71–81.

The following bond strengths were recorded:

Impregnated Rayon Cord

| | Mixture A | Mixture B |
|---|---|---|
| Static Bond Strength at 80° C. | 8.7 kg. | 11.6 kg. |
| Dynamic Bond Strength at 80° C. | 94 mins. | 164 mins. |

EXAMPLE 2

Test similar to those described in Example 1 were carried out with nonimpregnated nylon cord filaments. In addition to mixtures A and B used as the embedding mixtures for the cord filaments, a third mixture C was used which only differed from mixture B in that the quantity of resorcinol was increased to 2.5 parts by weight and the quantity of hexamethylol melamine to 2 parts by weight. The following bond strengths were recorded:

Nonimpregnated Nylon Cord

| | Mixture A | Mixture B | Mixture C |
|---|---|---|---|
| Static bond strength at 80° C. | 1.9 kg. | 7.2 kg. | 10.9 kg. |
| Dynamic bond strength at 80° C. | 91 mins. | 164 mins. | 97 mins. |

EXAMPLE 3

Tests similar to those described in Example 1 were carried out with polyester cord. This cord was initially impregnated with a 6 percent aqueous emulsion of a masked isocyanate, heated for 10 minutes to 150° C. and then impregnated in a second solution of the following composition:

| | |
|---|---|
| 40 percent latex of a copolymer of butadiene, styrene and vinyl pyridine | 250 parts by wt. |
| Precondensed resorcinol-formaldehyde resin | 20 parts by wt. |
| Formaldehyde | 6 parts by wt. |
| Water | 344 parts by wt. |
| | 620 parts by wt. |

Total dry content 20 percent

The following bond strengths were recorded:

Impregnated Polyester Cord

| | Mixture A | Mixture B |
|---|---|---|
| Static bond strength at 80° C. | 7.8 kg. | 9.3 kg. |
| Dynamic bond strength at 80° C. | 100 mins. | 125 mins. |

EXAMPLE 4

In a manner similar to the tests described in Example 1 and using a similarly impregnated rayon cord, embedding mixtures A' and B' were used which had the same composition as mixtures A and B, but in which the 100 parts by weight of natural rubber had been replaced by 100 parts by weight of a blend of natural rubber and styrene-butadiene rubber in a ratio of 1:1.

The following bond strengths were recorded:

Rayon Cord, Impregnated, in Mixtures of Natural Rubber and Styrene-Butadiene Rubber (1:1)

| | Mixture A' | Mixture B' |
|---|---|---|
| Static bond strength at 80° C. | 6.3 kg. | 8.0 kg. |
| Dynamic bond strength at 80° C. | 96 mins. | 176 mins. |

EXAMPLE 5

Nylon cord fabric which had been impregnated with the latex of a copolymer of butadiene, styrene and vinyl pyridine containing precondensed resorcinol formaldehyde resin in accordance with the recipe given in Example 3 for the second solution, and then dried for 10 minutes at 135° C, was used for the manufacture of 7.50×20 car tires. The natural rubber carcase mixture (mixture A in Example 1) on the one hand and mixture B of the same Example on the other hand, were used to coat the cord in a calendar. In one test run, the tread mixture consisted of a natural rubber-based mixture known per se, whilst, in the other test run, a mixture based on butadiene-styrene rubber was used to make the test conditions more difficult.

The tires thus produced were tested on a tire testing rig at a speed of 60 km. per hour, at normal tire pressure and under a load 20 percent greater than normal. The following wear properties were recorded:

|  | Carcass mixture without additives | carcass mixture containing 1.3 of resorcinol + 1 % percent of hexamethylol melamine |
| --- | --- | --- |
| Natural rubber tread | 13,000 km. | 29,500 km. |
| Styrene-butadiene rubber tread | 9,000 km. | 23,000 |

The temperatures recorded in the tyre shoulder with an injection-type pyrometer were the same with and without additives. In the case of the tires with styrene-butadiene rubber treads, the temperatures were some 5° C. higher than in the case of the tires with natural rubber treads, signifying that the required intensification of the test conditions had been produced by the addition of styrene-butadiene rubber.

EXAMPLE 6

Tests similar to those described in Example 1 were carried out with similarly impregnated rayon cord filaments. Mixture B was, however, altered to mixture D to the extent that, in place of one part by weight of hexamethylol melamine, it contained 1.3 parts by weight of hexamethylol melamine pentamethyl ether. The following bond strengths were recorded under otherwise the same test conditions as in Example 1:

Impregnated Rayon Cord

|  | Mixture A | Mixture D |
| --- | --- | --- |
| Static bond strength at 80° C. | 9.2 kg. | 12.4 kg. |
| Dynamic bond strength at 80° C. | 120 mins. | 170 mins. |

EXAMPLE 7

Tests similar to those described in Example 2 were carried out with nonimpregnated nylon cord. Mixture C was replaced by a mixture E which, in place of 2 parts by weight of hexamethylol melamine as in mixture C, contained 2.5 parts by weight of hexamethylol melamine trimethylether. Tests carried out with mixtures A and E yielded the following bond strengths:

Nonimpregnated Nylon Cord

|  | Mixture A | Mixture E |
| --- | --- | --- |
| Static bond strength at 80° C. | 2.2 kg. | 9.5 kg. |
| Dynamic bond strength | 19 mins. | 124 mins. |

EXAMPLE 8

Tests similar to those described in Example 1 were carried out using a mixture F in place of mixture B under otherwise the same conditions as described in that Example. Mixture F contained 2.5 parts by weight of resorcinol and 2.0 parts by weight of hexamethylol melamine hexa-acetate in place of 1.3 parts by weight of resorcinol and 1 part by weight of hexamethylol melamine. In this case, too, impregnated rayon cord was used. The following bond strengths were recorded:

|  | Mixture A | Mixture F |
| --- | --- | --- |
| Static bond strength | 7.3 kg. | 10.0 kg. |
| Dynamic bond strength at 80° C. | 59 mins. | 108 mins. |

EXAMPLE 9

Tests similar to those described in Example 1 were carried out with the same rubber mixtures as were used in that Example, modified to the extent that, in place of 100 parts by weight of natural rubber, as in mixtures A and B, they contained 75.0 parts by weight of natural rubber, and 25 parts by weight of polybutadiene rubber. Nonimpregnated nylon cord was used. The mixture containing hexamethylol melamine and resorcinol is denoted by the reference H, whilst the comparison solution which did not contain these additives is denoted by the reference G. The following bond strengths were recorded.

|  | Mixture G | Mixture H |
| --- | --- | --- |
| Static bond strength at 80° C. | 1.7 kg. | 5.3 kg. |
| Dynamic bond strength at 80° C. | 10 mins. | 58 mins. |

EXAMPLE 10

Tests similar to those described in Example 1 were carried out with the same rubber mixture as were used in Example 1, modified to the extent that, in place of 100 parts by weight of natural rubber as in mixtures A and B, they contained 50.0 parts by weight of natural rubber and 50.0 parts by weight of polyisoprene rubber. As in Example 1, impregnated rayon cord was used. In this case, the mixture containing hexamethylol melamine and resorcinol is denoted by the reference M, whilst the comparison mixture, from which these additives were excluded, is denoted by the reference L. The following bond strengths were recorded:

|  | Mixture L | Mixture M |
| --- | --- | --- |
| Static bond strength at 80° C. | 6.2 kg. | 9.1 kg. |
| Dynamic bond strength at 80° C. | 71 mins. | 81 mins. |

EXAMPLE 11

Mixtures based on butadiene-acrylonitrile rubber were prepared on mixing rolls, as described in Example 1. The mixtures had the following composition:

|  | Mixture N | Mixture O |
| --- | --- | --- |
|  | parts by wt. | parts by wt. |
| butadiene-acrylonitrile rubber | 100.0 | 100.0 |
| SRF-black | 30.0 | 30.0 |
| FEF-black | 20.0 | 20.0 |
| Resorcinol | – | 2.5 |
| Zinc oxide | 5.0 | 5.0 |
| Cumarone resin | 5.0 | 5.0 |
| xylene-formaldehyde resin | 10.0 | 10.0 |
| stearic acid | 0.5 | 0.5 |
| N-phenyl-N'-cyclohexyl-p-phenylene diamine | 0.8 | 0.8 |
| Phenyl-α-naphthylamine | 0.8 | 0.8 |
| Sulfur | 2.0 | 2.0 |
| N-diethyl-2-benzothiazyl-sulphenamide | 1.5 | 1.5 |
| Hexamethylolmelamine-pentamethylether | – | 2.5 |

Nonimpregnated nylon cord was incorporated during vulcanization into these mixtures by the method described in Example 1.

The following bond strengths were recorded:

|  | Mixture N | Mixture O |
| --- | --- | --- |
| Static bond strength at 80° C. | 2.4 kg. | 5.8 kg. |
| Dynamic bond strength at 80° C. | 9 mins. | 42 mins. |

EXAMPLE 12

The procedure described in Example 1 was repeated with the only exception that instead of mixture B there was used mixture P which differed from mixture B only by substituting the 1.3 parts by weight of resorcinol by 1.3 parts by weight of m-aminophenol.

Nonimpregnated nylon cord was used for the tests. Thereby the following bond strengths were obtained:

|  | Mixture A | Mixture P |
| --- | --- | --- |
| Static bond strength at 80° C. | 2.2 kg. | 6.2 kg. |
| Dynamic bond strength at 80° C. | 30 mins. | 196 mins. |

We claim:

1. An article of manufacture comprising vulcanized rubber bonded to a textile, said textile being either an untreated textile or having an adhesion promoting surface coating thereon, the rubber of said article of manufacture adjacent said untreated or said surface coated textile having incorporated therein, prior to vulcanization, as a first additive, 0.2 to 8 percent by weight, based on the amount of rubber employed, of a member selected from the group consisting of hexamethylol melamine, a lower aliphatic carboxylic acid ester of hexamethylol melamine and a partial lower alkyl ether of hexamethylol melamine wherein from 1 to 5 hydroxyl groups are etherified and, as a second additive, a member selected from the group consisting of resorcinol, m-aminophenol, m-phenylene diamine, resorcinol diacetate, resorcinol propionate, resorcinol butyrate, resorcinol monomethylether, resorcinol monopropylether and 1, 5-dihydroxy naphthalene, the amount of said second additive being from 0.5 to 2 times the amount of said first additive, said rubber being selected from the group consisting of natural rubber, polyisoprene, polybutadiene, polychlorobutadiene and copolymers of (a) butadiene and styrene, (b) butadiene and acrylonitrile, (c) isobutylene and isoprene and (d) ethylene and propylene, and blends thereof, and said textile being selected from the group consisting of rayon, polyamide, polyester, polyacrylonitrile and cotton.

2. The article of manufacture of claim 1 wherein said first additive is said partial ether of hexamethylol melamine.

3. The article of manufacture of claim 2 wherein said first additive is hexamethylol melamine pentamethylether.

4. The article of manufacture of claim 1 wherein said first additive is hexamethylol melamine.

5. The article of manufacture of claim 1 wherein said first additive is said ester of hexamethylol melamine.

6. The article of manufacture of claim 5 wherein said ester is hexamethylol melamine hexa-acetate.

7. The article of manufacture of claim 1 wherein said textile is an untreated polyamide textile.

8. A vulcanized rubber tire reinforced with a textile, said textile being either an untreated textile or having an adhesion promotion surface thereon, the rubber of said vulcanized rubber tire adjacent said untreated or said surface coated textile having incorporated therein, prior to vulcanization, 0.2 to 8 percent by weight, based on the amount of rubber present, of a member selected from the group consisting of hexamethylol melamine, a lower aliphatic carboxylic acid ester of hexamethylol melamine and a partial lower alkyl ether of hexamethylol melamine wherein from 1 to 5 hydroxyl groups are etherified and, as a second additive, a member selected from the group consisting of resorcinol m-aminophenol, m-phenylene diamine, resorcinol diacetate, resorcinol propionate, resorcinol butyrate, resorcinol monomethylether, resorcinol monopropylether and 1, 5-dihydroxy naphthalene, the amount of said second additive being from 0.5 to 2 times the amount of said first additive, said rubber being selected from the group consisting of natural rubber, polyisoprene, polybutadiene, polychlorobutadiene and copolymers of (a) butadiene and styrene, (b) butadiene and acrylonitrile, (c) isobutylene and isoprene and (d) ethylene and propylene, and blends thereof, and said textile being a member selected from the group consisting of rayon, polyamide, polyester, polyacrylonitrile and cotton.

9. The vulcanized rubber tire of claim 8 wherein said first additive is said partial ether of hexamethylol melamine.

10. The vulcanized rubber tire of claim 9 wherein said first additive is hexamethylol melamine pentamethylether.

11. The vulcanized rubber tire of claim 8 wherein said first additive is hexamethylol melamine.

12. The vulcanized rubber tire of claim 8 wherein said first additive is said ester of hexamethylol melamine.

13. The vulcanized rubber tire of claim 12 wherein said ester is hexamethylol melamine hexa-acetate.

14. A method of producing an article of manufacture comprising rubber bonded to a textile, said textile being either an untreated textile or having an adhesion promoting surface coating thereon, said method comprising the steps of incorporating in the rubber adjacent said untreated or said surface coated textile, prior to vulcanization, a first additive comprising 0.2 to 8 percent by weight, based on the amount of rubber employed, of a member selected from the group consisting of hexamethylol melamine, a lower aliphatic carboxylic acid ester of hexamethylol melamine and a partial lower alkyl ether of hexamethylol melamine wherein from 1 to 5 hydroxyl groups are etherified and a second additive comprising a member selected from the group consisting of resorcinol, m-aminophenol, m-phenylene diamine, resorcinol diacetate, resorcinol propionate, resorcinol butyrate, resorcinol monomethylether, resorcinol monopropylether and 1, 5-dihydroxy naphthalene, the amount of said second additive being from 0.5 to 2 times the amount of said first additive, said rubber being selected from the group consisting of natural rubber, polyisoprene, polybutadiene, polychlorobutadiene and copolymers of (a) butadiene and styrene, (b) butadiene and acrylonitrile, (c) isobutylene and isoprene and (d) ethylene and propylene, and blends thereof, and said textile being selected from the group consisting of rayon, polyamide, polyester, polyacrylonitrile and cotton and vulcanizing said rubber.